(12) United States Patent
George

(10) Patent No.: US 6,697,359 B1
(45) Date of Patent: Feb. 24, 2004

(54) HIGH PERFORMANCE SWITCH FABRIC ELEMENT AND SWITCH SYSTEMS

(75) Inventor: William R. George, Minnetonka, MN (US)

(73) Assignee: Ancor Communications, Inc., Eden Prairie, MN (US)

( * ) Notice: Subject to any disclaimer, the term of this patent is extended or adjusted under 35 U.S.C. 154(b) by 0 days.

(21) Appl. No.: 09/346,793

(22) Filed: Jul. 2, 1999

(51) Int. Cl.[7] ............................................. H04Q 11/00
(52) U.S. Cl. ....................................... 370/357; 370/256
(58) Field of Search ........................ 370/357, 389–400, 370/390–393, 352, 412, 230–236, 410, 355–358, 381, 399, 474; 351/355, 261, 380, 401, 219; 709/227, 238

(56) References Cited

U.S. PATENT DOCUMENTS

| | | | | |
|---|---|---|---|---|
| 5,144,622 A | * | 9/1992 | Takiyasu et al. | 370/401 |
| 5,367,520 A | * | 11/1994 | Cordell | 370/395 |
| 5,687,172 A | * | 11/1997 | Cloonan et al. | 370/395 |
| 5,748,612 A | * | 5/1998 | Stoevhase et al. | 370/230 |
| 5,818,842 A | * | 10/1998 | Burwell et al. | 370/397 |
| 5,987,028 A | * | 11/1999 | Yang et al. | 370/380 |
| 5,999,528 A | * | 12/1999 | Chow et al. | 370/365 |
| 6,047,323 A | * | 4/2000 | Krause | 709/227 |
| 6,081,512 A | * | 6/2000 | Muller et al. | 370/256 |
| 6,308,220 B1 | * | 10/2001 | Mathur | 709/238 |
| 6,411,599 B1 | * | 6/2002 | Blanc et al. | 370/219 |
| 6,424,658 B1 | * | 7/2002 | Mathur | 370/429 |
| 6,449,274 B1 | * | 9/2002 | Holden et al. | 370/392 |

OTHER PUBLICATIONS

Malavalli, K., et al., "Distributed computing with fibre channel fabric", *Proc. of the Computer Soc. Int'l Conf., Los Alamitos, IEEE Comp Soc. Press., Vol. Conf. 37, XP000340745*, 269–274, (Feb. 24, 1992).

Martin, C.R., "Fabric interconnection of fibre channel standard nodes", *Proceedings of the SPIE, XP000562875*, 65–71, (Sep. 8, 1992).

* cited by examiner

*Primary Examiner*—Chi Pham
*Assistant Examiner*—Prenell Jones
(74) *Attorney, Agent, or Firm*—Schwegman, Lundberg, Woessner & Kluth, P.A.

(57) ABSTRACT

A high performance switch fabric element and flexible link interconnection topologies and frame addressing techniques therefor are disclosed. The fabric element, which may be a 16 port ASIC with internal steerable interconnection among all ports. The fabric element ports each have a unique local routing table, thereby avoiding the need for a global routing table for ports as is provided in the prior art. This also permits addressing and routing from port to port within the fabric element without need for look-up references from off the fabric element, thereby contributing to speed. The fabric element can be used in multiples interconnected by unique link interconnection techniques including cascade, mesh, microstaging, and combinations thereof. These link interconnection techniques provide unique switch topologies that permit high performance switching chassis or network box having a significantly larger number of ports than is achievable with the prior art techniques.

9 Claims, 8 Drawing Sheets

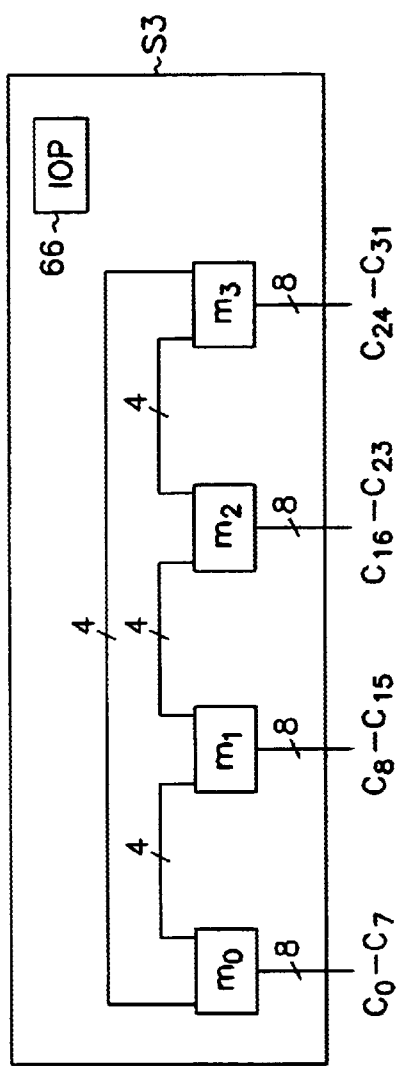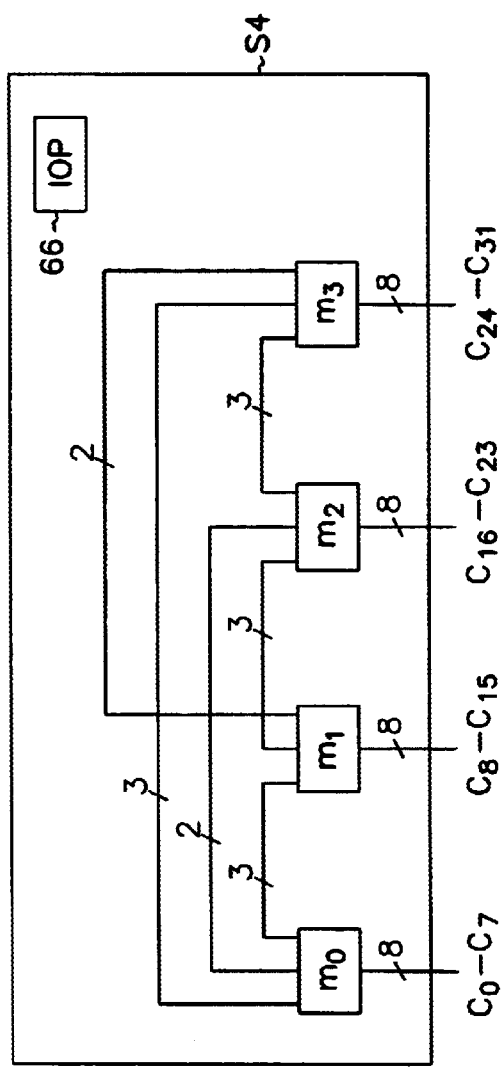

HIGH PERFORMANCE SWITCH FABRIC ELEMENT AND SWITCH SYSTEMS

FIELD OF THE INVENTION

This invention pertains generally to the field of high performance switching, including switches, switch systems and networks, and interconnect and addressing techniques suitable for implementing very high performance switching functions such as those defined in the Fibre Channel standards.

BACKGROUND OF THE PRIOR ART

The need for high performance switching solutions continues to grow in the fields of computing and data handling systems. Examples of such systems include interconnecting computers and high-performance storage devices, interconnecting computers in a multiple-computer operating environment, and anywhere else where multiple high-speed data interconnections must be established between designated nodes or groups of nodes in a data handling network. Higher bandwidth and greater switching flexibility are prime concerns for switches and devices to be used in such systems.

The Fibre Channel standard, ANSI X3.T11, is intended to address these concerns. The Fibre Channel standard itself broadly defines classes and standards of performance, but does not dictate the implementation technologies to be used in providing these functions. A particular design of a switch to implement Fibre Channel functions is referred to as the 'fabric' of the switch.

Most presently available switch fabrics do not implement all of the Fibre Channel functions. There are a number of reasons for this, some technological and some economic. For some applications only a subset of the Fibre Channel functions are needed. But in other cases, a larger set of Fibre Channel functions would be desirable, but the cost and technological complexity of implementation remain as formidable hurdles.

In commonly-owned copending U.S. patent application Ser. No. 60/098742 filed Sep. 1, 1998, entitled HIGH PERFORMANCE SWITCHING, certain methods and switch configurations for providing high performance Fibre Channel or other switching systems are described. Those systems are based on unique switch chassis, and unique methods of interconnecting the chassis to create larger networks. The method of interconnecting chassis in that patent application might be termed "multistaging", because it provides for the interconnecting of individual switch chassis in preferred ways to achieve larger networks.

The present invention provides further improvements in high performance switching networks and methodology, by improvements in switching modules and interconnections thereof within a switch chassis to achieve higher performance, reduced complexity and greater flexibility.

It is conventional in prior art high performance switch chassis try to make use of a number of similar switch modules, and to provide means for interconnecting them on a printed circuit board or otherwise within a chassis. Often the switch modules may consist of a custom switch modules with a given number of input or output ports, for example 2, 4 or 8. Ideally, most or all of the custom switch module is implemented in single ASIC (application-specific integrated circuit), with additional supporting elements or chips as needed. Depending on which Fibre Channel functions are being implemented, it may be necessary in such prior art systems to provide a number of different custom switch module and ASIC types, to cover different types of Fibre Channel Ports. The custom switch module can generally handle requested switch connections within itself and involving its own ports. To create a switch chassis product with a more useful number of channels, for example 32, 48 or 64, it is desirable to somehow interconnect a number of such custom switch modules within the chassis.

The conventional way of doing this is to provide a high-speed bus, often referred to as a backplane, which interconnects all the custom switch modules. A fabric controller may also be programmed to direct traffic between custom switch modules according the particular requested switch connections. It is readily apparent that in such systems the bandwidth of the backplane and the operation of the fabric controller are critical. In practice, the backplane becomes the limiting factors in terms of chassis channel count, performance, and cost. In such prior art systems, attempts to increase the number of channels in a chassis quickly leads to high demands on the backplane and fabric controller, in terms of technological limitations, complexity and cost. These factors have effectively limited the number of channels in prior art switch chassis design, if any reasonably high data rates are to be maintained.

SUMMARY OF THE INVENTION

The present invention provides further improvements in high performance switching networks and methodology, and for providing a practical implementation of Fibre Channel protocols. The present invention achieves this through a method referred to herein as microstaging.

According to one aspect of the invention, the present invention provides a single fabric element, typically a single ASIC. The links between all of the ports of the ASIC are internal to the ASIC. This fabric element can be used in multiples to provide a high performance switching chassis of a significantly larger number of ports than is achievable with the prior art techniques.

According to another aspect of the invention, the fabric element ports each have a unique local routing table. This avoids the need for a global routing table for ports as is provided in the prior art. This also permits addressing and routing from port to port within the fabric element without need for look-up references from off the fabric element, thereby contributing to speed.

According to another aspect of the invention, frame transfer decisions are made using transmitter frame tags based on transmitter need and pulling frames, rather than receiver pushing frames.

According to another aspect of the invention frame steering is based on either parsed frame destination address fields for high scalability systems, or destination address field value for aliasing steering, with both methods available concurrently at any port. The steering logic may thus provide complete hardware routing of both unicast and multicast functions.

According to another aspect of the invention, a method of hard zoning is provided by setting permission bits in steering logic, so that frames may be blocked from certain destinations.

According to another aspect of the invention, a plurality of fabric elements make up a switching chassis, or network box, by unique link interconnect techniques. This avoids the problems associated with backplane bus structures. The link interconnection techniques of the present invention allow cascade, mesh microstaging, and combinations thereof. According to the microstaging aspect of the invention, a predetermined number of fabric elements use a predetermined number of their ports as channel input/output connections for the switching chassis. Preferably, these fabric elements use half of their ports for this purpose, with the remaining half used for link interconnection. In addition, for switching chassis with larger numbers of ports, some fabric elements are used only for interconnecting the fabric elements which serve as channel ports.

According to a presently preferred embodiment of the invention, a 16-port fabric element is provided, and microstaging interconnections are provided to create 32 channel, 64 channel or 128 channel switching chassis. In addition, the 128 channel microstaged switch chassis embodiment can be extended to support 256 channels, which corresponds a the full Fibre Channel Domain.

These and other features and advantages are provided with the present invention, as illustrated in the detailed descriptions of the preferred embodiments which follow.

BRIEF DESCRIPTION OF THE DRAWING

FIG. 3 is a block diagram of a 32 channel chassis using cascade link interconnection;

FIG. 4 is a block diagram of a 32 channel chassis using mesh link interconnection;

DETAILED DESCRIPTION OF THE PREFERRED EMBODIMENTS

Figure 1:
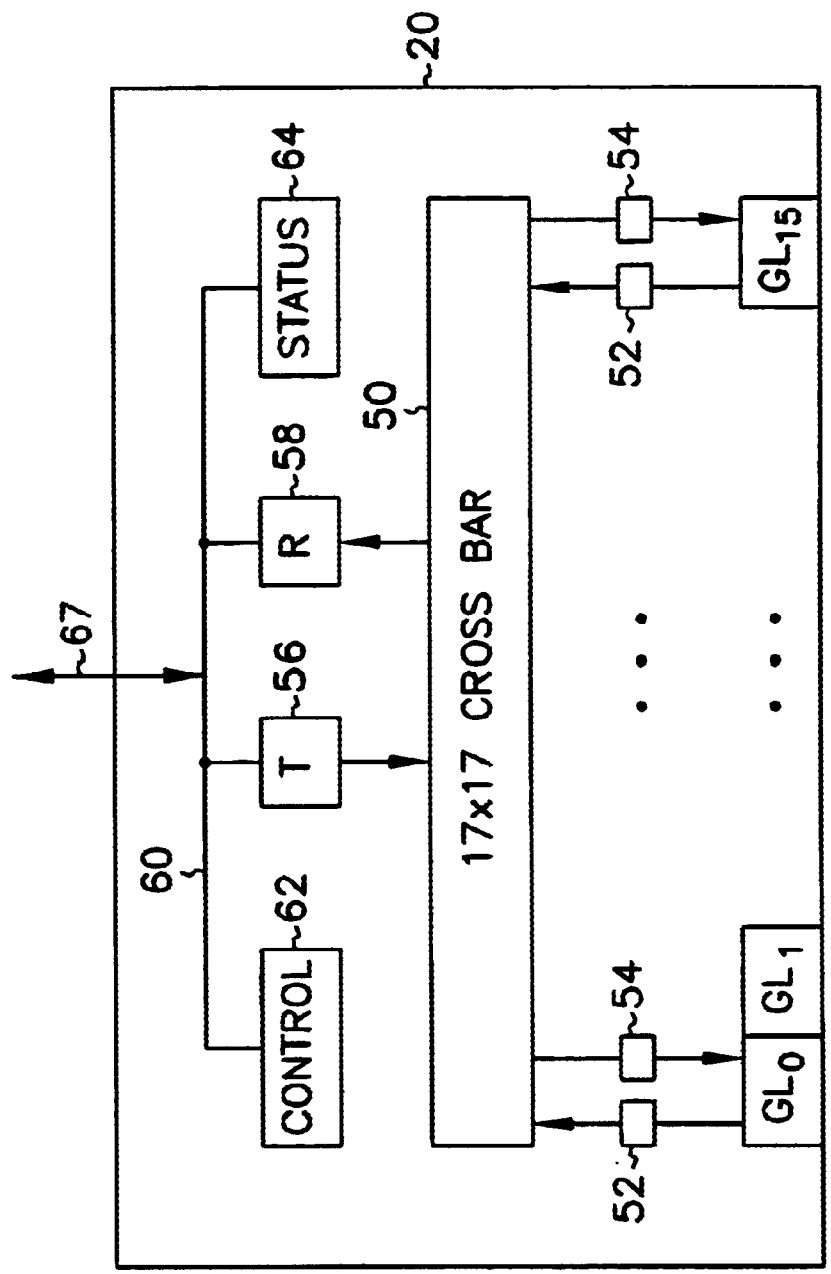
FIG. 1 is a block diagram showing functional detail of a 16-port ASIC fabric element according to one aspect of the invention.

FIG. 1 is a block diagram of a 16-port ASIC fabric element according to one aspect of the invention, and FIG. 1 illustrates in block diagram form the general architecture of a 16 channel switch chassis using the 16-port fabric element of FIG. 1 In the preferred embodiment the fabric element comprises ASIC 20. In this preferred embodiment, ASIC 20 has 16 ports, with full non-blocking Fibre Channel class 2 (connectionless, acknowledged) and class 3 (connectionless, unacknowledged) service between any of the ports. It will be appreciated that fabric element ASIC 20 could also be designed for class 1 (connection) service, within the scope and operation of the invention as described herein. However, for applications not requiring class 1 service, a simpler design may be employed, and that is what is shown in the preferred embodiments in this specification.

The fabric element of the present invention is presently implemented as a single CMOS ASIC, and for this reason the terms "fabric element" and ASIC are both used in this patent specification to refer to the preferred embodiment of the fabric element. However, the invention is not limited to an ASIC implementation, nor is it limited to a single chip. Other technologies may be used, for example PGA (programmable gate array) devices, or any other implementation technology which provide a chip or chip set with the fabric element functions described herein.

Likewise, the selection of 16 ports is not a limitation of the invention, but is one possible choice, and one that offers particular performance and flexibility advantages. Any number of ports can be supported. As discussion of considerations of port numbers follows the explanation of microstaging, below. One feature of the invention is that a single fabric element type may advantageously be used for all the switching functions and positions in a chassis, thus leading to economies of design, development, and production. However, it is not necessary that a single type be used, and designs with multiple fabric elements may be used in this invention if desired.

ASIC 20 has 16 ports, numbered in FIG. 1 as $GL_0$ through $GL_{15}$. According to one aspect of the invention, these ports are generic to the common Fibre Channel port types F_Port, FL_Port, and E_Port. In other words, each GL port can function as any of these types, depending on what it is attached to. The use of the generic type port has advantages in terms of flexibility of use, but separate port types could be used if desired. In addition, these GL ports can function as a special (non-Fibre Channel standard) type of port, referred to herein as a B_Port, which is useful in fabric element linking, as described herein below.

For purposes of illustration all ports $GL_0$–$GL_{15}$ are shown as being on the same side of ASIC 20 in FIG. 1. In other Figures, discussed below, groups of 8 ports are drawn opposite sides of an ASIC. This is purely for convenience in presentation in the Figures, and does not imply any difference in port design. Actual physical placement of the ports will of course depend on the physical layout of the ASIC.

Each of the generic ports $GL_0$–$GL_{15}$ has transmit and receive connections to switch crossbar 50. One connection is through receive buffer 52, which functions to receive and temporarily hold a frame during a routing operation. The other connection is through a transmit buffer 54. Switch crossbar 50, which is shown and described in greater detail below in connection with FIG. 10, actually comprises a number of switch crossbars for handling specific types of data and dataflow control information. However, for purposes of the high-level view of FIG. 1, these switch crossbars are shown as a single switch crossbar 50. Switch crossbar 50 is a connectionless crossbar (packet switch) of known conventional design, sized to connect 17×17 paths. This is to accommodate the 16 GL ports plus a port for connection to a fabric controller which is external of the ASIC.

Figure 2:
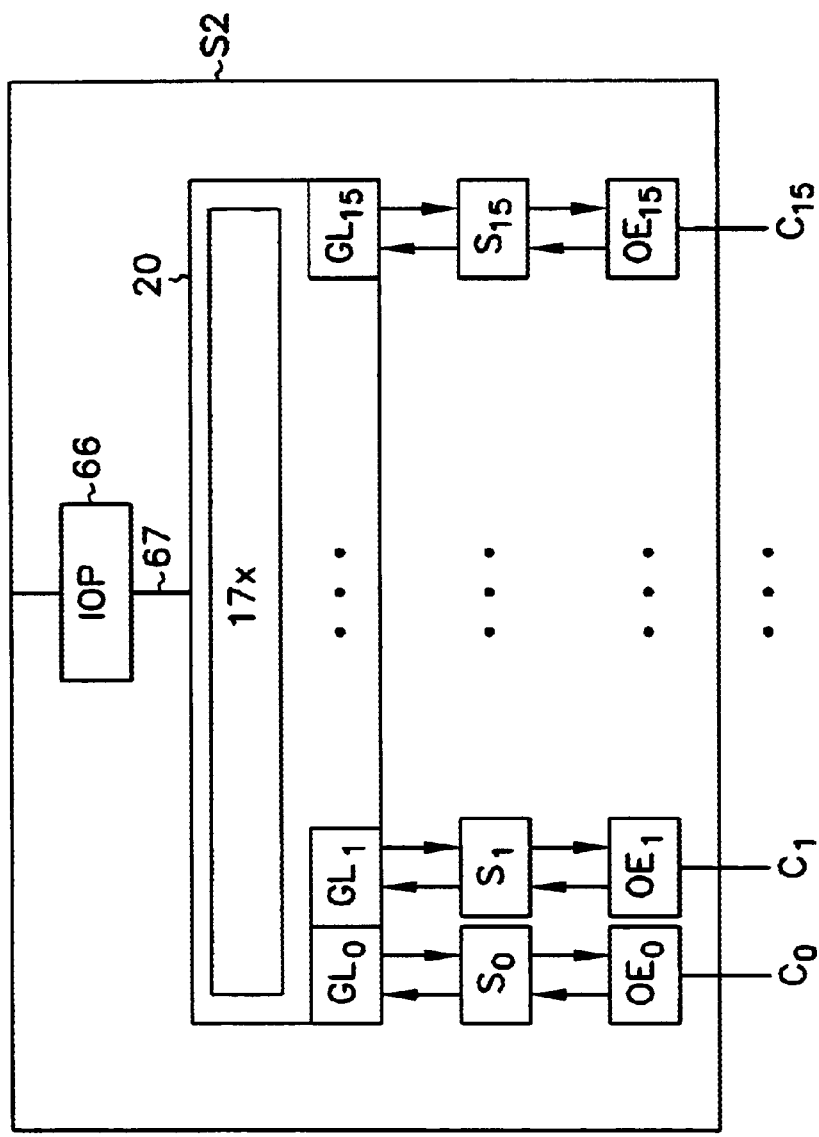
FIG. 2 is a block diagram of a single switch chassis (Domain) of 16 ports, using the ASIC fabric element of FIG. 1.

In the preferred embodiments of switch chassis described herein, the fabric controller is a firmware-programmed microprocessor, also referred to as the input/output processor (IOP). IOP 66 is shown in FIG. 2 as part of a switch chassis utilizing one or more of ASIC 20. As seen in FIG. 1, bidirectional connection to the IOP is routed through port 67, which connects internally to a control bus 60. Transmit buffer 56, Receive buffer 58, Control register 62 and Status register 64 also connect to bus 60. The Transmit buffer 56 and Receive buffer 58 connect the internal connectionless switch crossbar 50 to the external IOP so that it can source or sink frames. The function of the control register 62 is to receive and hold control information from the IOP, so that the IOP can change characteristics or operating configuration of the ASIC by placing control words in the register. The IOP can read status of the ASIC my monitoring various codes that are put into the status register 64 by monitoring circuits on the ASIC (not shown).

FIG. 2 shows a 16 channel switch chassis S2 utilizing an ASIC 20 as the fabric element. Chassis S2 includes ASIC 20, and IOP 66. In addition, it would typically include other components, such as a power supply (not shown). The 16 GL ports $GL_0$–$GL_{15}$ of ASIC 20 correspond to the 16 channels $C_0$–$C_{15}$. If for some reason it was desired to have a chassis with fewer channels than the number of ASIC ports, the unused ones would not be brought out.

Each of ports $GL_0$–$GL_{15}$ as shown in FIG. 2 has a serializer/deserializer (SERDES) with which it communicates. These SERDES are designated $S_0$–$S_{15}$ in the Figure. These are conventional components and are connected to the GL ports through standard parallel interfaces. Ideally, the serializer/deserializer function could be implemented on ASIC 20 for efficiency. However, current types of SERDES may generally consume too much power and generate too much noise for incorporation onto the switch ASIC. For these reasons, it is better to leave them separate, but connected with the ASIC on a small printed circuit board or other module. As the power and noise characteristics of SERDES improve, they may be incorporated on the ASIC.

Each GL port also has an opto-electric converters $OE_0$–$OE_{15}$ connected with its SERDES through serial lines, for providing fibre optic input/output connections, as is generally known in high performance switch design. The converters connect the switch channels $C_0$–$C_{15}$. Optionally, the ports can connect through copper paths instead of opto-electric converters.

While the embodiment of FIG. 2 shows each of the ASIC ports connecting through SERDES, in practice there are reasons some ports are operated without SERDES. As previously mentioned, these GL ports can function as a special type of port, referred to herein as a B_Port, which is useful in fabric element linking. For certain types of multiple ASIC switch topologies, it is advantageous to link a port of one ASICS to the port of another ASIC in the same chassis. In this case, the ports may operate as B_Ports, and the SERDES for these ports may be deleted at the time of manufacture, resulting in a cost savings. In that case, the ROM for the IOP for the chassis will have information stored therein that certain ports are B_Ports, resulting in the setting of control bits to tell the affected port logic to operate as B_Ports. The main difference between a B_Port and an F_Port is changes in the clocking signals, due to the lack of the SERDES. Whether linking without the SERDES is possible will in general depend on the electrical distance between the ports and the characteristics of the circuit board and connectors used.

To provide switch chassis having more than 16 channels, multiple fabric elements may be used in the chassis. Some means of intercommunication must be provided between the multiple fabric elements to permit full addressing flexibility among all ports. The fabric element provided by the present invention provides unique and particularly advantageous interconnect techniques for multiple fabric elements, with marked improvements in performance and configuration flexibility as compared with the prior art. Prior art switches use a bus, often referred to as the backplane, to interconnect different port circuits in a switch. For example, a number of ports are typically provided on a chip, and multiple chips are used in the switch to make up the desired number of chassis ports. The port-chips are all connected to the backplane bus, and this is how connections can be made between ports on different chips. This type of prior art design has been successful up to a point. However, in such switches, the backplane bus becomes a critical limiting factor, both in terms of cost and performance, as the number of ports increases. Because of these limitations, prior art backplane bus designs reach a practical limit with today's components at about 32 channels per chassis. Beyond that, the bus design becomes a bandwidth-limiting factor. By comparison, the fabric elements and link interconnect techniques of the present invention can easily provide up to 256 channel switches.

These advantages of the present invention are provided through unique link-interconnect configurations as described below, and through the use of advanced addressing techniques, which can easily support a wide variety of such link-interconnect topologies. In switch chassis of the present invention, there is no backplane bus. Instead, all the interconnections are provided using available ports on the fabric elements as interconnection links. This is made possible by the flexible addressing techniques provided with the individual ports on the fabric elements.

The link interconnect technique supported by the present invention includes several types which are referred to herein as cascade, mesh, microstaging, and certain hybrid combinations thereof.

Cascade link interconnection is illustrated in FIG. 3. Switch chassis S3 has four fabric elements, labelled $M_0$–$M_3$. It also has one or more IOPs 66. Depending on the size and number of fabric elements on the chassis one or more IOPs can be provided. Each fabric element could also have its own IOP, or a single IOP could communicate with more than one fabric element. Therefore, in the several Figures showing different switch chassis, it will be understood that the single IOP shown could represent multiple IOPs.

These fabric elements in FIG. 3 each have eight of their ports brought out as chassis channels, numbered $C_0$–$C_{31}$ in groups of eight. Other ports of the fabric elements are used for the cascade link interconnection. Specifically, each of fabric elements $M_0$–$M_3$ have four ports connected to its neighboring fabric element. For example, $M_0$ has four ports connected to $M_1$, which in turn has four ports connected to $M_2$, and so on. The four at each end of the cascade may be left unused, or may be looped to the fabric element at the other end, as shown. Note that in theory, only one interconnection is absolutely needed to each neighbor, but for bandwidth and performance considerations, it is better to provide four such links. In this manner each channel can communicate to each other channel, directly in the case of a destination on the same fabric element, or indirectly through cascade connection for destination on other fabric elements. Through the addressing techniques discussed below, any channel can address any other channel on chassis S3. For addressing another channel on the same ASIC, the switching can be done internally to the ASIC. For addressing a channel on a different ASIC, switching will have to use one or more of the cascade link interconnections to get to the desired channel.

Although FIG. 3 shows a 32 channel chassis, it will be appreciated that the number of fabric elements and channels can be extended as desired be simply cascading more fabric elements. Since each added fabric element can link connect to its neighbor, there is no mathematical limit to the number that can be added. However, within the context of Fibre Channel switching, the limit would be 256 channels, which is a full Domain. However, for performance reasons, cascade link interconnection would probably not be used for large switches, because of the delay caused by the large number of "hops" in the worst case of going to the most remote fabric element. The advantages of cascade link interconnection are simplicity and low cost. The disadvantage is low performance in the case of larger channel switches. However, depending on the application and the nature of the data devices to be connected, the cascade link interconnection switch may be a good choice. Judicious choice of device connection can help avoid performance problems. Devices expected to communicate frequently can be connected to channels in the same fabric element, and those which are expected to communicate only occasionally can be of different fabric elements.

Mesh link interconnection is illustrated in FIG. 4. Switch chassis S4 has four fabric elements, labelled $M_0$–$M_3$. These fabric elements each have eight of their ports brought out as chassis channels, numbered $C_0$–$C_{31}$ in groups of eight. Other ports of the fabric elements are used for the mesh link interconnection. Specifically, each of fabric elements $M_0$–$M_3$ connects directly to each other fabric element. For bandwidth and performance considerations, it is preferable to have more than one link to each other fabric element. The number of such links is limited by the number of ports available. In the case of four 16-channel fabric elements, one preferable topology is for each fabric element to have three links connected to two of the fabric element, and two links to the other. For example, and the connections of three can be used to advantage in connecting devices to the channels, based on expected usage of certain channels. Again, the addressing techniques of the present invention can be used to address any channel, in any connection topology.

The advantage of mesh link connection is higher performance than cascade link connection, because each fabric element is directly connected to each other. The disadvantage is a limitation on the maximum switch size using mesh link interconnection. For the case of 16 channel fabric elements, the maximum is 72 channels, which is limited by the number of fabric element ports available for link connection to each other fabric element.

Figure 5:
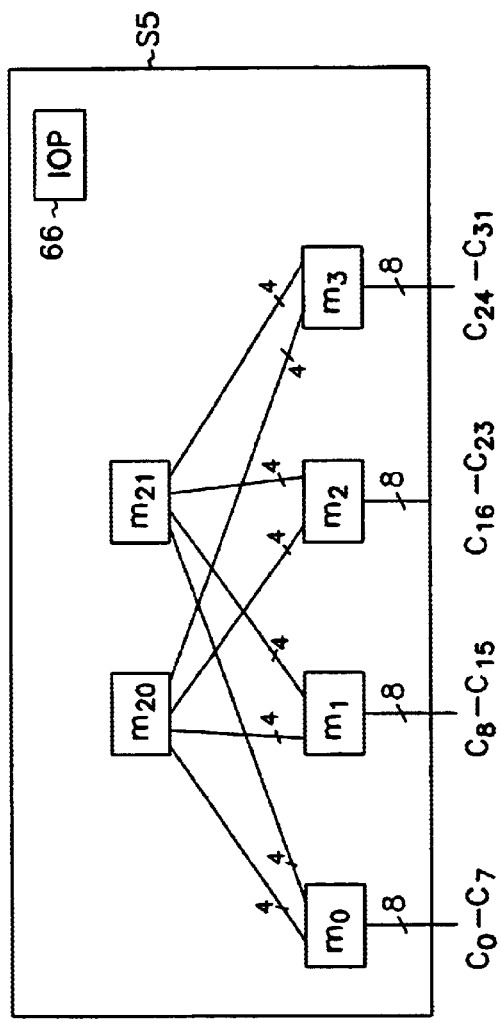
FIG. 5 is a block diagram of a 32 channel chassis using microstaging link interconnection.
Figure 6:
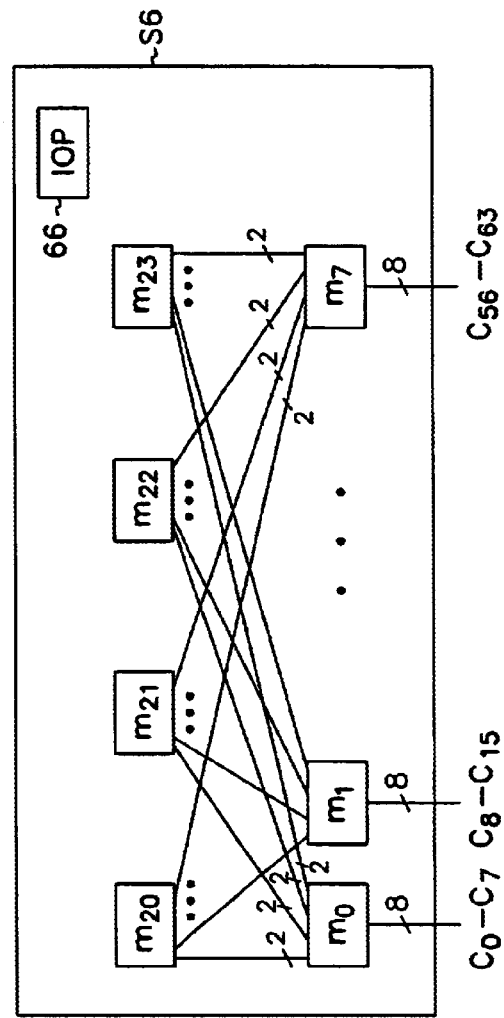
FIG. 6 is a block diagram of a 64 channel chassis using microstaging link interconnection.
Figure 7:
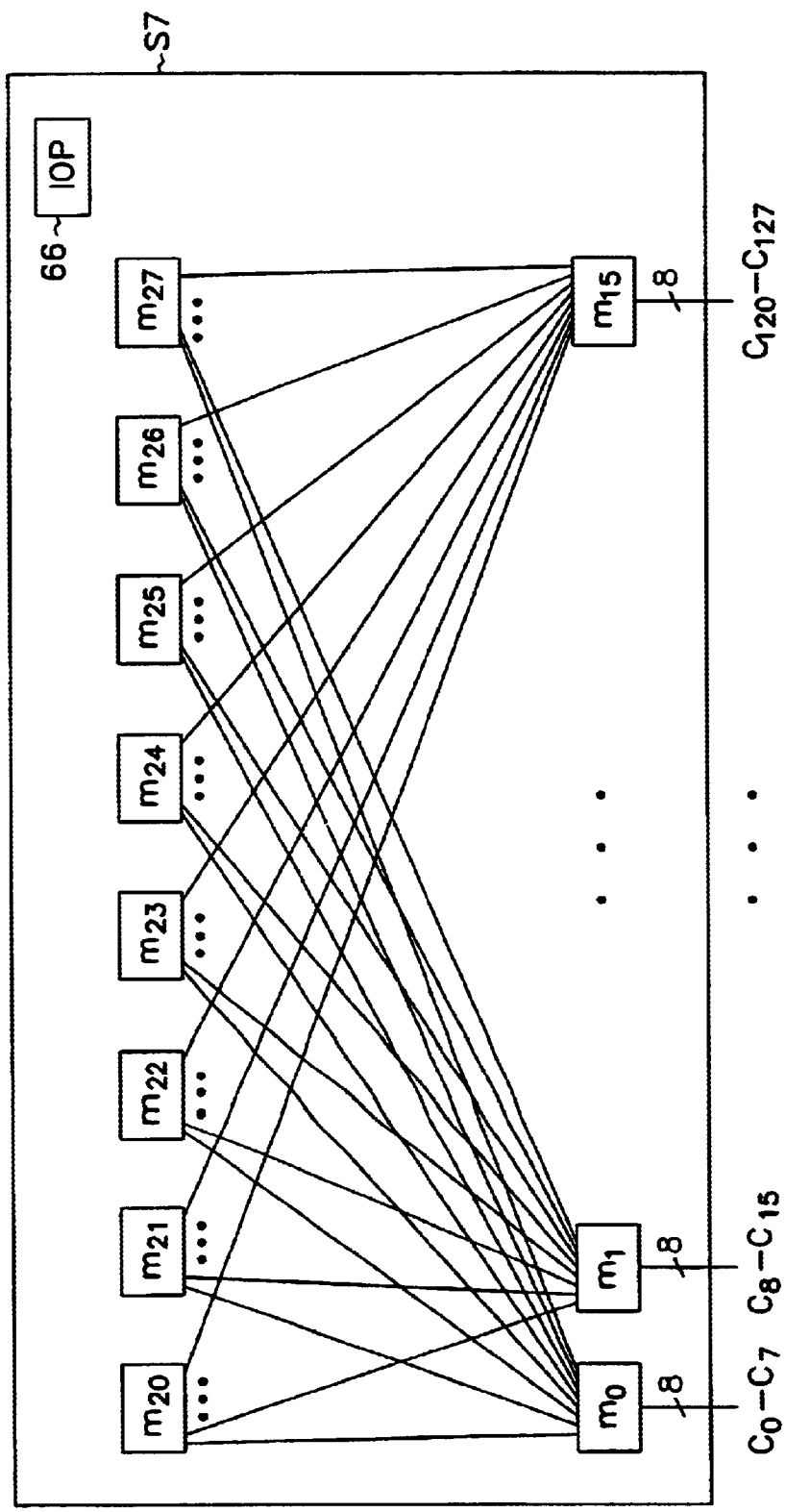
FIG. 7 is a block diagram of a 128 channel chassis using microstaging link interconnection.

A third, and very important type of link interconnection, referred to herein as microstaging, is shown in FIGS. 5–7. FIG. 5 shows a 32 channel chassis S5 which has six fabric elements $M_0$–$M_3$ and $M_{20}$–$M_{21}$. For convenience of terminology, $M_0$–$M_3$ are referred to as front row, in the sense that they connect to the chassis channels, and $M_{20}$–$M_{21}$ are referred to as back row, in the sense that they provide microstaging interconnection for the front row elements. As previously pointed out, all are preferably identical. However, the ports used as microstaging links may be programmed as B_Ports, thus saving the cost of SERDES for those ports.

Fabric elements $M_0$–$M_3$ each have eight of their ports brought out as chassis channels, numbered $C_0$–$C_{31}$ in groups of eight corresponding to the front row fabric elements. The other eight ports of each of the front row fabric elements are connected to the back row fabric elements as microstaging links. Specifically, each front row fabric element has four ports connecting to each of the two back row fabric elements, $M_{20}$–$M_{21}$. In this manner, each front row fabric element has multiple paths to each other front row element. Through the addressing format discussed below, any channel can address any other channel on chassis S5.

The advantage of microstaging link connection is higher performance than cascade link connection, and higher performance and larger numbers of channels per chassis as compared to mesh link interconnection. A disadvantage, in the case of a small, 32 channel chassis, is that it requires additional fabric elements, specifically six instead of four in the mesh or cascade versions. However, it makes up for this in improved performance, with more possible connections, and in the fact that microstaging makes possible larger switches. Also, as compared to the prior art bus backplane type of switch, the microstaging link interconnect switch is much less complex and costly, and does not have the backplane bottleneck limitation to performance.

The advantages of microstaging become even more significant in the case of the 64 channel chassis S6, FIG. 6. Chassis S6 has 12 fabric elements. Eight of these, $M_0$–$M_7$ are front row, and each of these has eight ports connected to channels, for a total of 64 channels $C_0$–$C_{63}$. Each front row fabric element has its other eight ports connected to back row fabric elements $M_{20}$–$M_{23}$. Specifically, each front row fabric element has two ports connected to each back row fabric element. (For clarity of illustration only some of the connections are shown in FIG. 6.) While there are only two paths from each front row fabric element to each back row fabric element, compared to four in the 32 channel chassis, there are now twice as many back row fabric elements, so each front row fabric element has still has eight possible paths to each other front row fabric element, the same as in the 32 channel chassis. The microstaging interconnection at this point clearly has a very large advantage over a conventional design, which would by comparison, have to provide a backplane bus for interconnecting all of the eight channel-connected fabric elements.

FIG. 7 shows a 128 channel microstaging link interconnected chassis S7. Chassis S7 has 24 fabric elements. Sixteen of these, $M_0$–$M_{15}$ are front row each having eight ports connected to channels, for a total of 128 channels $C_0$–$C_{127}$. Each front row fabric element has its other eight ports connected to back row fabric elements $M_{20}$–$M_{27}$. Specifically, each fabric element has one port connected to one of each back row fabric element. (For clarity of illustration only some of the connections are shown in FIG. 7.) While there is only one path from each front row fabric element to each back row fabric element, compared to two in the 64 channel chassis, there are again twice as many back row fabric elements, so each front row fabric element still has 8 possible paths to each other front row fabric element, the same as in the 32 and 64 channel chassis.

Microstaging link interconnection at this point clearly has a very large advantage over a conventional design, which would by comparison, have to provide a backplane bus for interconnecting all of the 16 channel-connected fabric elements. There is some question whether such a backplane could even be provided at a reasonable cost or performance. Another advantage of the microstaging connection is that the interconnections between different fabric elements are passive, whereas a backplane connection bus would have to have many active components. That would translate into cost, and also into lack of flexibility. Since the interconnect link connections themselves in the present invention are passive, the connection patterns can be provided in the chassis, and fabric elements can be interchangeable.

Figure 8:
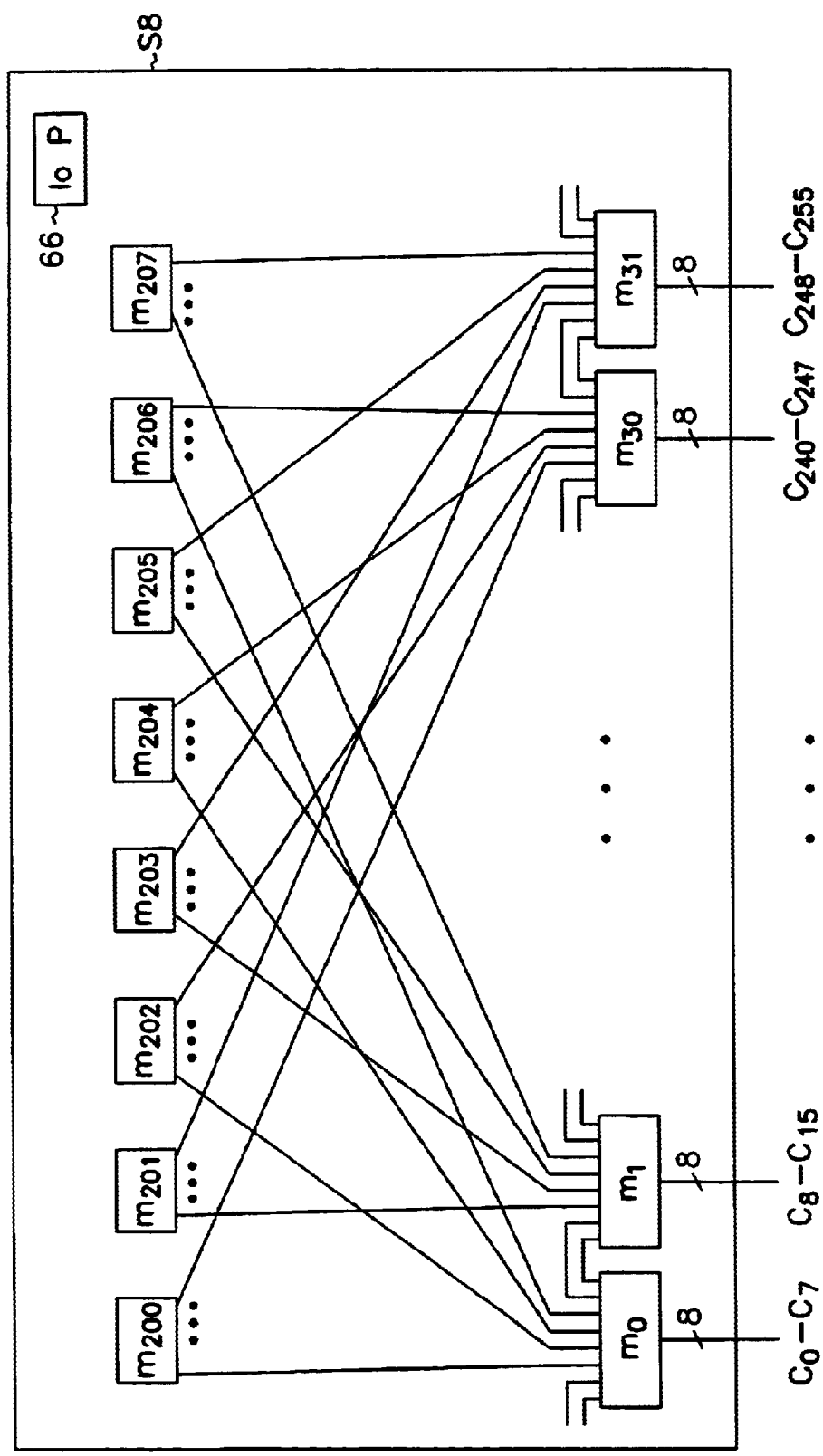
FIG. 8 is a block diagram of a 256 channel chassis using a hybrid microstaging-cascade link interconnection.

With a 16 channel fabric element, the 128 channel chassis is the maximum for straight microstaging, because it uses all the available eight ports for the eight back row fabric elements. However, other techniques may be used in conjunction with microstaging to provide a greater number of channels. FIG. 8 shows how a 256 channel chassis S8, which equals the full Fibre Channel Domain address space.

Chassis S8 is formed from using 40 fabric elements, and a hybrid form of link interconnection, which is a cross between microstaging and cascade. Thirty-two of the fabric elements, $M_0$–$M_{31}$, are front row each having eight ports connected to channels, for a total of 256 channels $C_0$–$C_{255}$. Eight of the fabric elements, $M_{200}$–$M_{207}$ are in the back row. Because of limitations on numbers of ports, each front row fabric element is linked only to every other one of the back row fabric element, in modified microstaging link connection. In a preferred form, the even numbered front row fabric elements each have one port connected to one port on each even numbered back row fabric element, and each odd numbered front row fabric element has one port connected to one port on each odd numbered back row fabric element. (For clarity of illustration only some of the connections are shown in FIG. 8.) In addition, each front row fabric element $M_0$–$M_{31}$ has two ports connected in cascade fashion to both neighbors. The end fabric elements $M_0$ and $M_{31}$ have two ports which may be unused, or which may be looped back to the other end, such that $M_0$ and $M_{31}$ become cascade neighbors.

Linked in this manner, each of the 256 channels can communicate with each other channel. If in the same fabric element, the connection can be made internally of the fabric element. For connection to channels on other front row fabric elements, the switch can use the microstaging link connections to the back row fabric elements, or the cascade link connections between front row elements, or a combination of the two. For example, if the destination channel is on a neighbor fabric element, the cascade link can be used. If the destination channel is not on a neighbor, the back row microstaging link interconnection can be used. For some cases, a combination of microstaging and cascade is needed.

Considering the case of microstaging link interconnection, with a larger number of ports per fabric element, a chassis can be made correspondingly larger. The maximum number of channels that can be supported by microstaging link interconnection of fabric elements is related to the number of ports per element. For microstaging interconnection of fabric elements having X ports per element, a switch chassis can support up to n channels, where $$n = \frac{X^2}{2}.$$

This is for microstaging alone: when combined with other techniques, additional channels may be provided. In considering the relationship $$n = \frac{X^2}{2},$$

there are design choices to be made in the application of microstaging. A smaller number of ports per fabric element has the advantage of lower complexity of the fabric element, but has the disadvantage of a smaller number of possible channels in microstaging applications. Similarly, a larger number of ports per fabric element can make for microstaging of larger channel-count chassis, but at a cost of complexity in the design of the fabric element, which cost may be in terms of production cost, or performance.

For example, an 8-port fabric element could provide maximum 32-channel chassis. While this is useful, it does not provide a very large chassis, and chassis of this capacity can be made by prior art techniques. When one provides a 16-port fabric element, as described in the examples above, one can provide up to a 128 channel chassis (and more, with hybrid techniques). This is a significant improvement over conventional backplane designs, which by comparison reach a practical limit with today's components at about 32 channels per chassis. A 32-port fabric element could provide a 512-channel chassis. However, this may not practically desirable, for a number of reasons. The complexity of a 32 port fabric element might lead to possible compromises on the fabric element design and performance. The need for a single 512 channel chassis is questionable, in view of the probable physical size, and the fact that systems of that number of channels are more flexibly provided by a number of smaller units.

It is of course possible to make fabric elements having other numbers of ports, not just the power of 2, for example, 12 or 20. In fact, a port number of about 12 may give the optimum efficiency, in terms of speed and size. However, considering the prevalence of binary or byte-based addressing schemes, such other numbers are probably not the best choices. This is especially true for use in Fibre Channel switches, for compatibility with established addressing fields.

It will be appreciated from the examples discussed above that a great number of different switch topologies are possible using combinations of the fabric elements and link interconnections of the present invention. In practice, it is also necessary to provide a comprehensive, yet simple and flexible addressing and frame steering scheme, in order to be able to achieve the potential of these topologies. The present invention provides addressing to accomplish these tasks.

Figure 9A:
FIG. 9A is a diagram of the Fibre Channel D_ID address field.

FIGS. 9A, B, C illustrate how the 24-bit Fibre Channel D_ID address field is used for addressing within the link interconnected chassis provided by the present invention. The defined Fibre Channel D_ID field is shown in FIG. 9A. The lower bits 0–7 are used for addressing within an arbitrated loop (AL_PA in Fibre Channel terminology). Bits 8–15 are used for the Fibre Channel Area, which is the port number within a Domain, and bits 16–23 are used for the Domain or chassis, which is the highest order addressing concept.

Figure 9B:
FIG. 9B is a diagram of use of the Fibre Channel D_ID address field for addressing in 8 or 16 channel chassis according to the present invention.

The present invention uses the AREA bits of the D_ID field as the Port address in the link interconnected chassis. The bits for the Arbitrated loop, and for the Domain, are unchanged from Fibre Channel standard usage. FIG. 9B shows how the Area field is used in the present invention, in the case of an 8- or 16-channel chassis. In either of these cases, there is only one 16-port fabric element with its 16-port ASIC. Therefore bits 8–11 can be used to address the 16 ports. Bits 12–15 are not needed.

Figure 9C:
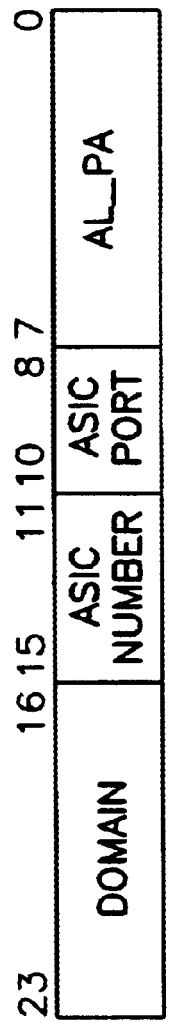
FIG. 9C is a diagram of use of the Fibre Channel D_ID address field for addressing in 32 up to 256 channel chassis according to the present invention.

FIG. 9C shows how the Area field is used in the present invention in the case of a 32, 64, 128, or 256 channel chassis. In these cases, there are more than one fabric element, but each fabric element has only 8 of its ports used as channels (the other 8 are used in link interconnects). Therefore, only three bits, 8–10 are needed for the channel -port number within the ASIC. However, since there can be up to 32 front row fabric elements (ASICs), five address bits, 11–15 are needed for them.

In this manner, the standard Fibre Channel D_ID address field may be used to individually address each of the 256 channels of the chassis of FIG. 8. Of course, the same applies to the smaller chassis of FIGS. 3–7, except that not all bits will be used in each case. A Fibre Channel frame appearing at any channel may therefore specifically address any other channel in the chassis.

Using the 16-port fabric element and the addressing and steering techniques of the invention, it is possible to support up to 256 Domains, each of 256 channels, for a total of 65,536 channels, (less the number of channels used as trunks.)

The following is an overview of how the address fields are used for frame steering. If one of the chassis of FIGS. 3–8 is used alone, all channels in the network will be in the same Domain. However, a link interconnected chassis according to FIGS. 3–8 can be multistaged with other chassis, in which case different chassis will have different Domain numbers. In such multistaging, the individual chassis may be interconnected in system cascade, system mesh, system cross-connect, or any other interconnection. When a frame is presented as an input at a channel port, the Domain of the D_ID is first examined. If the destination Domain is the same as the input port Domain, the frame stays on the chassis; if different, it is routed to another chassis, specifically it is routed to the correct channel which is connected to the next chassis, according to the current system topology. Then the input port checks the ASIC number. If the destination ASIC matches the input port's ASIC number, the frame will stay on the ASIC, and is simply routed to the appropriate port through the port number portion of the D_ID. Of course, at the destination port, if there is an arbitrated loop, it routes by the AL_PA portion of the address.

If, however, the Domain is correct, but the destination ASIC number is not the same as the input channel ASIC, then the input port has to look up the route to the destination ASIC number. Actually, as can be seen in FIGS. 3–8, because there are multiple links between fabric element, there are multiple routes to the intended fabric element. For example, in FIG. 6, a port on fabric element $M_0$ could get to a port on a port on fabric element $M_1$ through fabric element $M_{20}$ or $M_{21}$, using any of the eight links from $M_0$ and any of the links into $M_1$. A single path for a specific port to another specific port, referred to as a virtual channel, can be uniquely chosen and programmed at startup, so that in operation that will be the only path used for that connection, to preserve in-order delivery of frames. Once the frame gets to the Destination ASIC, routing is through the port number, previously described.

Figure 10:
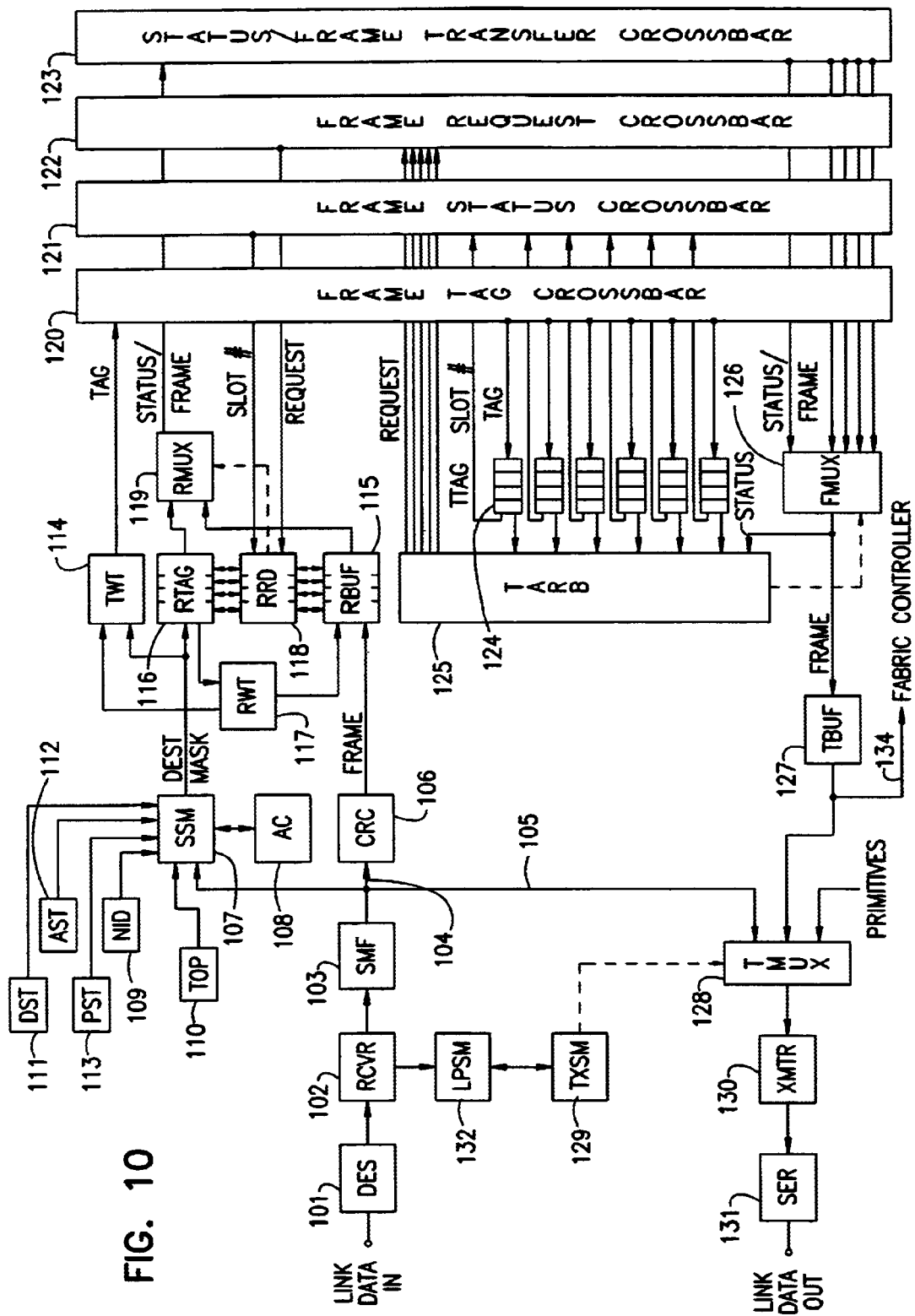
FIG. 10 is a block diagram of a fabric element in greater detail, showing details of the address decoding and frame steering techniques of the present invention.

FIG. 10 shows another view of the ASIC 20 of FIG. 1 in somewhat greater detail, including the crossbars 120–123. In FIG. 1, the crossbars were referred to collectively as a single functional block with reference number 50. In the more detailed view of FIG. 10, it is seen that this crossbar function is actually made up of four separate switch crossbars. These are Frame Tag Crossbar 120, Frame Status Crossbar 121, Frame Request Crossbar 122, and Status/Frame Transfer Crossbar 123. In addition, FIG. 10 shows one input link and one output link, and the address handling and frame steering associated therewith. It will be understood that each ASIC has 16 such pairs of input/output links. However, for purposes of clarity of the drawing, only one pair is shown. The other 15 pair connect to the crossbars 120–123 in the same manner, as does the port to the IOP. The crossbars 120–123 are used in conjunction with the steering system to route each frame to its intended destination(s), as described below.

Reference number 101 (DES) is the deserializer portion of SERDES $S_n$ of FIG. 2, and reference number 131 (SER) is the serializer portion. These connect respectively to the Data Link in and Data Link out optos. DES 101 converts incoming serial link data to 10-bit parallel data synched to Fibre Channel "comma" characters, and passes the data to receive pipe (RCVR) 102. RCVR receives parallel 10-bit 10B data from the DES and demultiplexes it to 20-bit data, and decodes 10B to 8B data with error checking, and adds a parity bit. In addition, RCVR performs numerous Fibre Channel-1 and -2 functions such as detecting Start-Of-Frame, End-Of-Frame, Idles, R_RDYs and the like, which will not be explained in detail here, as they are standard functions. Frames received by RCVR 102 are eventually written to the receive buffer (RBUF) 115 (except for certain Fibre Channel AL frames). RCVR 102 also connects to the smoothing FIFO (SMF) 103 which performs smoothing functions as required by FC_AL, in order to accommodate clock frequency variations between the remote transmitting and local receiving devices.

Reference number 104 is the frame entry path. All frames entering this port of the switch fabric follow this path to be written to RBUF 115, as opposed to frames following the AL path 105, which are retransmitted onto the same link. Path 105 is used when the link is in AL Monitoring or AL Bypass mode, as specified by FC_AL. In that case, all data received off the link will be transmitted back onto the link, except for Fibre Channel Ordered Set that are deleted by or inserted by SMF.

The CRC Check (CRC) 106 further processes frames that are entering the fabric by checking the CRC and processing errors according to FC_PH rules. It then passes frames to RBUF 115, where they will subsequently be steered to the appropriate output link.

The steering state machine (SSM) 107 also receives the frame, and determines which of the 17 possible destinations on the fabric (16 GL_Ports and the fabric controller) the frame is to be forwarded to. SSM produces a 17-bit destination mask, where there is one bit for each destination. Any bit set to ONE specifies a legal destination, and there can be multiple bits set in there are multiple destinations for the same frame.

SSM 107 makes this determination through use of information contained in the Alias Cache (AC) 108, the Native ID (NID) register 109, the Port Steering Table (PST) 113, the ASIC Steering Table (AST) 112, the Domain Steering Table (DST) 111, and Topology register (TOP) 110. All the tables are written by the IOP based on the existing switch fabric topology, so that the correct exit paths are selected for the intended destination port addresses.

AC 108 stores selected addresses to support the Fibre Channel Alias Address function. AC 108 provides complete hardware routing of broadcast and multicast functions as well as any other FC alias functions. For FC alias functions, the D_ID is a value or instruction, rather than an address. AC is a multi-entry cache of 24-bit D_ID values, three bits that enable comparing on major ID fields of Domain, Area and Port for additional flexibility, and a 17-bit destination mask. In use, SSM compares the frame D_ID against all entries of AC, and if there is a match in any entry, the associated destination mask will be used for steering. The number of AC entries is an implementation option.

If there is no match in AC 108, then SSM steers via TOP, NID, DST, AST and PST instructions, as described below, for unicast functions.

NID 109 is a 16-bit programmable value which specifies the native ID of the particular GL_Port, providing native Domain number, Area number, and Port number. It is used to compare against the frame D_ID (bits 23:16) when routing by parsing the frame D_ID.

TOP 110 is a 2-bit programmable value specifying the position this particular ASIC has in a topology, in order to cue SSM on how to parse the frame D_ID when routing by the steering tables.

Domain steering table (DST) 111 is a programmable lookup table having an entry for each one of all supported Domain values. Each entry contains a 4-bit Destination field which specifies which chip path to take to find that particular Domain, and a 1-bit Valid field which specifies whether that Domain exists or is available in the system as configured. The DST table is consulted when the frame D_ID specifies a Domain Number different than that specified by NID. The number of supported Domain values in an implementation option.

The valid bit for the DST can be used to provide a very useful form of hard zoning. The valid bit would be cleared if the Domain doesn't exist at all in a particular network, and in addition, the valid bit can be cleared if the Domain exists but is not intended to be available to this particular channel. For security reasons in some network installations, it is important that certain channels or groups of channels are isolated from communication to or from certain other channels or groups. The system administrators need a mechanism to ensure that certain users or devices connected to the network do not gain access to certain channels and the devices connected thereto. Complete physical separation may not be wanted, because it may still be important for certain channels to send to others, while preventing sending in the opposite direction. In prior art switching networks, this zoning has been implemented by programming the fabric controllers to check Domains and addresses in the Fibre Channel Alias Server, and permit or deny access from and to certain channels based thereon. However, users from devices connected to the network might under some circumstances gain access to prohibited devices by deliberate "hacking" scanning all addresses, or changing names in the Alias Server. The hard zoning provided by the present invention cannot be changed by a user connected to a channel. Only a system administrator can do so, by preloading the valid bit for certain Domains, in the DST of selected fabric elements. By this selection, certain channel groups can be hard zoned from sending to destination channels in certain Domains.

ASIC steering table (AST) 112 is a programmable lookup table which has an entry for each one of 32 ASIC values. Each entry contains a 4-bit destination field which specifies which chip path to take to find that particular ASIC, and a 1-bit Valid field which specifies whether that ASIC exists in the system. The valid bit would be cleared if the ASIC doesn't exist at all, or if it exists but is not available to this particular port, which provides a form of hard zoning. The AST table is consulted when the frame D_ID specifies a ASIC Number different than that specified by NID Port steering table (PST) 113 is a programmable lookup table which has an entry for every one of 16 Port values. Each entry contains a 1-bit Valid field which specifies whether that Port exists in the system. The valid bit would be cleared if the Port doesn't exist at all, or if it exists but is not available to this particular port, which can again be used to provide a form of hard zoning. If the entry is valid, the frame D_ID (11:8) specifies the port number the frame is to be routed to. This table is consulted when the frame resides in the destination ASIC and all that is left is to route to the correct GL_Port.

Receive buffer (RBUF) 115 is the standard link receiver buffer specified by the Fibre Channel specification, and can hold multiple frames. The maximum number of frames is the connectionless "credit" count of the buffer, which is announced in logon response to the attached device. Any number from 1 to 256 can be implemented.

Tag writer (TWT) 114 functions to write tags to all destinations specified in the destination mask generated by SSM 107. It will always write at least one tag (unicast, or addressed to the fabric), but can write multiple tags for multicast. Each tag written by TWT 114 identifies its corresponding frame by containing the RBUF 115 slot number where the frame resides, and an indication that the tag is valid.

Reference number 116 designates the RBUF Tags register (RTAG). Each slot in RBUF 115 has an associated set of tags which are used to control the availability of the slot. The primary tags are a copy of the Destination Mask generated as the frame was processed by the SSM 107. As is described in detail below, each destination for a frame is so notified, and the destination then requests and receives a copy of the frame. As each destination requests a copy of the frame, the appropriate Destination Mask bit in RTAG 116 is cleared. When all Destination Mask bits are cleared, all specified destinations have received a copy of the frame and the corresponding frame slot in RBUF 115 is empty and available for a new frame.

In addition, RTAG 116 has other tag information containing frame content information that must be passed to the requesting destination to precondition the destination for the frame type to be transferred. These tags are transferred to the destination via Read Multiplexer (RMUX) 119 and the Status/Frame Transfer Crossbar 123.

For illustration purposes, both RTAG 116 and RBUF 115 are shown as having four credits, but it will be appreciated that in practice it is generally desirable to have considerably more than four, up to 256, and that there will be as many RTAG sets as there are RBUF credits.

RBUF Write Control (RWT) 117 specifies which empty RBUF 115 slot will be written into when a new frame arrives through the data link, from CRC 106 . RWT 117 controls the RBUF 115 write address and provides the slot number to TWT 114 for passing to the specified destinations.

RBUF Read Control (RRD) 118 processes frame transfer requests from various destinations, for all slots in RBUF 115. Frames can be read out of RBUF 115 in any order, irrespective of the order written, and readout order is determined by the order in which destinations request the frames. RRD 118 controls "read windows" where multiple destinations can receive a copy of the same frame simultaneously. RRD 118 also clears RTAG 116 Destination Mask bits as frame transfers occur.

Read Multiplexer (RMUX) 119 provides for passing to a destination, the information in the slot specified by the destination. First the RTAG 116 frame status is passed, until the destination requests the frame transfer, when the frame from RBUF is passed. RRD 118 controls what RMUX 119 is passing.

Frame Tag Crossbar 120 is a 17×17 interconnect that allows all TWTs to write their tags to any destination. Each TWT 114 has 17 destination "strobes," and a 4-bit "slot" specifier. For any given frame, TWT 114 will activate the "strobes" to all destinations specified in the Destination Mask, which will cause the writing of the RBUF 115 slot number to the appropriate Transmit Tags (TTAG)s 124.

Frame Slot Crossbar 121 is a 17×17 interconnect that allows additional RTAG 116 frame information to be forwarded to a destination after the destination has chosen this frame to be transmitted. The destination provides the RBUF 115 slot number of the chosen frame, and RTAG forwards the frame status to RMUX 119 and the Status/Frame Transfer Crossbar 123.

Frame Request Crossbar 122 is a 17×17 interconnect that allows destinations to request the transfer of the frame from the specified RBUF 115 slot. The destination makes the request, and RBUF 115 will either transfer the frame to the destination, or can optionally reject the transfer.

Frame/Status Transfer Crossbar 123 is a 17×17 interconnect that allows a frame to be transferred from an RBUF 115 slot to a destination. The status/frame transferred is from the buffer slot specified on the Frame Slot Crossbar 121. First the frame status is passed on this path to precondition the destination for proper frame handing, then the frame itself is transferred.

Transmit Tags register (TTAG) 124 provides for each destination a list of all frames on the chip that are to be transmitted by the destination. Transmit Arbiter (TARB) 125 is then free to choose which source to process next, and which frame from that source to process next. Each frame tag contains a "valid" indication, and a RBUF 115 "slot number" indication.

TTAG 124 is a collection of tag FIFOs, one for each source, providing for 17 FIFOs. For any source, the TWTs 114 write the tag in one end of the FIFO, while TARB 125 reads tags out of the other end. This provides the basic function of insuring that frames will be transmitted in the same order received by the source, to insure in-order delivery. For any given source, there are as many cells in the TTAG 124 FIFO as there are credits in RBUF 115.

The oldest frame tag presents a "valid" indication to TARB 125, and it provides the "slot number" to the source so that the frame status is available by the Status/Frame Transfer Crossbar 123, so that when TARB 125 is ready to process the frame, TARB 125 has all the information it needs to begin the transfer.

For illustrative purposes, TTAG 124 is drawn as if there are 5 sources, each with 4 credits. In practice, there will be 17 FIFOs for 17 different sources (16 GL_Ports and the IOP), and the depth of each FIFO will reflect the number of credits at each source, which can be 1–256 for GL_Ports, and any number for the IOP.

Transmit Arbiter (TARB) 125 determines which source is to be next, and how many frames will be served from that source, before going on to service another source. The method for choosing sources and how long to service a source is preferably chosen depending on what transmitter characteristics are desirable for the market being pursued in a given implementation.

TARB 125 activates anytime there are one or more valid frame tags in TTAG 124. When TARB 125 is servicing a source, the oldest frame tag for that source forces the frame status for that source and slot to be forwarded to the destination. As soon as TARB 125 has completed preconditioning its controls for the frame, it requests the frame and waits for the frame to be seen on the Status/Frame Transfer Crossbar 123 and then written into Transmit Buffer (TBUF) 127. After the transfer is complete, TARB 125 may request another frame from the same source or choose to service any other source with a valid frame indication.

Frame Mux (FMUX) 126 is a 17-way multiplexer used to initially transfer frame status to TARB 125, then transfer the frame itself to TBUF 127. FMUX 126 input path selection is determined by TARB 125, which selects the source.

For illustrative purposes, FMUX is drawn in FIG. 10 as if there are 5 sources. In practice, for a 16 port ASIC there are 17 sources, comprising 16 GL_Ports and the IOP.

Transmit Buffer (TBUF) 127 is a buffer capable of holding one frame of 2148 bytes, and fed by FMUX 126. TBUF 127 is the path to the link transmitter. Typically, frames don't "land" in TBUF 127 in their entirety as they may in RBUF 115, but pass through TBUF 127 on the way to the transmitter. TBUF 127 exists to provide an elasticity function in cases where the TBUF 127 read rate is different than the TBUF 127 write rate.

TBUF 127 also exists to provide the Path 134 To Fabric Controller function for frames that are exceptions and have to be processed by the Fabric Controller (not shown). TARB 125 will transfer the exception frame from an RBUF 115 to TBUF 127, then immediately move the frame to the IOP for handling.

Transmit Mux (TMUX) 128 chooses which data path to connect to the transmitter. The sources are: primitive sequences specified by the IOP, primitive sequences and signals as specified by TXSM 129, frames following the loop path, or steered frames exiting the fabric via TBUF 127.

Transmit State Machine (TXSM) 129 chooses the exact data to be sent to the link transmitter, and enforces all Fibre Channel rules for transmission. TXSM 129 receives requests to transmit from LPSM 132, from TBUF 127, and from various IOP functions. Loop State Machine (LPSM) 132 controls transmit and receive functions when the GL_Port is in loop mode. LPSM 132 operates to support loop functions as specified by FC-AL and FC-AL-2.

TXSM 129 also handles all credit management functions, so that Fibre Channel connectionless frames are transmitted only when there is link credit to do so.

Transmitter (XMTR) 130 puts the selected transmission source into the proper format for transmission on the output data link. For frames, it first checks for parity errors on the frame, before it is encoded from 8B to 10B, marking frames "invalid" according to Fibre Channel rules if there was a parity error. For all Fibre Channel transmission words, it then converts to 10B, and multiplexes the data into the format required by the Serializer 131.

Serializer (SER) 131 converts parallel transmission data to serial before passing the data to the link media. SER 131 may be internal or external to the ASIC.

With the functions of the individual components of FIG. 10 having been described above, the following is an overview of the operation of the steering and routing functions.

The steering registers 109–113 and the alias cache 108 are loaded at startup. This can be done by loading parameters from a program which has been configured according to the switch and network topology in which the individual fabric elements are linked. This can also be done automatically as part of the topology discovery process used in Fibre Channel. Once done, it does not need to be done again unless it is desired to change the switch or network topology. The loading of these parameters effectively tells each ASIC in the switch its native ID, and the output path from the ASIC itself, to each other port anywhere in the switch, and, if the switch chassis is connected into a network, to each other port anywhere in the network. This latter information implicitly is the topology information, insofar as frame steering is concerned.

The purpose of the SSM 107 is to generate the destination mask for each received frame. Again, the SSM does not have to know, or solve, the complex general problem of all steering to get to the final destination, only the immediate problem of steering the frame to one (or more) of the ASICs own ports. None of the fabric elements ever has to be responsible for the overall routing throughout the entire switch or network. Each simply makes local decisions for its own output ports. When a frame is received and sent to RBUF 115, the SSM 107 simultaneously begins decoding the destination address for the frame. The address is simultaneously compared in the Alias Cache 108 and in the steering registers 109–113. If there is a hit in the Alias Cache 108, there is no need to complete the decoding in the steering registers. In this case, the Alias Cache 108 returns the steering mask for that address, and the process of tag writing and frame transfer can continue to the output port(s) designated in that mask.

If there is no hit in the Alias Cache 108, the steering registers 109–113 come into play. The Domain of the destination address is compared to the domain of the ASIC's Native ID, and if there is not a match, then DST outputs a destination mask for the frame for steering to the correct port (previously programmed at initialization) off this ASIC to go to the correct Domain.

If the Domain matches, the ASIC number of the destination address is compared to the ASIC's Native ID ASIC number. If there is a match, then routing can be completed by port number, and the destination mask is generated accordingly from the PST 113.

If there is a match for Domain, and a miss for ASIC number, then the AST 113 is consulted for the destination mask to get to the destination ASIC from this ASIC, and routing proceeds from there.

Once the destination mask for the frame has been created, the frame is routed to the output port of the ASIC, using the tags, crossbars and transmit arbiter, as previously described. One important feature of the invention is that the actual routing of frames from port to port within the ASIC is done on the basis of the soonest availability of the destination port to receive a particular frame. Thus, the frame transfer methodology utilized in the preferred form of the invention is based on transmitter frame tags and transmitter need, to determine which cached frames to transmit next. This is referred to as transmitter frame pull, as opposed to receiver frame push. In the here is no head-of-line blocking as would be the case if frames were handled by a receive buffer on a first in, first out basis. In such systems, if there is a delay with the destination port, all frame traffic is held up on the fabric element until it is resolved. The multiple crossbars, tags, status and arbitration techniques of the present invention prevent there from being head-of-line blocking.

Another important feature of the present invention is the ease and flexibility with which addressing and frame steering is accomplished, even in the face of complex, and varied topologies in which the fabric elements can be interconnected. As pointed out above with reference to FIGS. 4–9, individual fabric elements can be linked in a wide variety of numbers and interconnect topologies to form many different switch chassis. These in turn can be interconnected in different numbers and topologies to form a wide variety of switch networks. The actual routing path from one channel port to any given other channel port can take a tremendous number of possibilities, leading to a correspondingly great number of complexities in frame routing. However, in the present invention, the entire problem of routing does not have to be solved for each frame at each fabric element. Instead, each fabric element only has to route the frame to the correct one of its ports, and hand it off to the next fabric element (unless the destination port is on the same fabric element). The next fabric element again only has to route the frame to the correct one of its ports, and so on until the final destination channel is reached. The mapping of each input port to each possible destination port for the entire switching network, is taken care of by the steering logic, which basically examines the address bits of each frame and compares them to the known topological position of the ASIC, to create the destination mask. The topological position of each ASIC or fabric element needs to be written to each ASIC only once, upon startup, or automatically on topology discovery at startup. Thereafter, until it is desired to reconfigure the switch for some reason, each ASIC can simply route to its correct output port based on this topology information.

This methodology also permits virtual channels, as discussed above. Because each port receiving a frame has its own steering logic, the destination masks can be programmed by the IOP so that a given path is always taken from one a given port to a given destination port. This is made possible because the steering tables are local to each port. If the steering tables were global to the fabric element, then the look-up provided would send all frames to a particular fabric element over the same path. There would be no way to discriminate. However, with virtual channels, it is possible specify the entire path that will be used from a particular port to another particular port, even if it is on a different fabric element, even with multiple hops to get to the destination fabric element. This virtual channel can be defined and extent through the entire chassis, and entire network of multiple chassis, by setting the destination masks for each link receiver at programming time. This feature can bu used to balance loads, and also to ensure in-order delivery of frames between given ports.

It will be seen from the above that the present invention provides an improved high performance switch fabric element, and linking and addressing techniques to provide large, high performance switches and networks. While specific embodiments of the invention have been described, it will be appreciated that the invention is not limited to those specific applications, and that many variations are possible within the scope of the invention.

What is claimed is:

1. An integrated circuit switch fabric element, comprising:

sixteen ports each operable to receive and transmit data frames;

interconnection circuits to route data frames received at any one of the ports to any one or more of the ports for transmission according to a received destination address, the interconnection circuits including multiple independent crossbars for use in routing the data frames;

each of the ports have a local routing table, and logic for comparing the destination address to the table to determine the one or more of the ports to which the data frames are to be routed; and the interconnection circuits operative to route data frames to the one or more of the ports based on the comparison of the destination address to the table performed by the logic.

2. A switching system, comprising:

a plurality of integrated circuit (IC) switch fabric elements, each IC fabric element having a plurality of ports and switch routing circuits for selectively providing data communication between selected ports;

I/O data paths connecting some of the ports of the IC fabric elements to data channels of the switching system; and interconnect links connecting other ports of the IC fabric elements as links between individual IC fabric elements, the ports of the IC fabric elements that connect to interconnect links between IC fabric elements being identical to the ports of the IC fabric elements that connect to data channels of the switching system, whereby data communication may be established between any of the channels of the switching system through one or more of the IC fabric elements.

3. A switching system, comprising:

a plurality of integrated circuit (IC) switch fabric elements, each IC fabric element having a plurality of ports and switch routing circuits for selectively providing data communication between selected ports;

I/O data paths connecting some of the ports of the IC fabric elements to data channels of the switching system;

interconnect links connecting other ports of the IC fabric elements as links between individual IC fabric elements, the ports of the IC fabric elements that function as interconnect links between IC fabric elements being identical to the ports of the IC fabric elements that connect to data channels of the switching system; and the IC fabric elements linked in a mesh configuration with the interconnect links connecting at least one port of each fabric element to at least one port of each other fabric element.

4. A switching system, comprising:

a plurality of integrated circuit (IC) switch fabric elements, each IC fabric element having a plurality of ports and switch routing circuits for selectively providing data communication between selected ports;

I/O data paths connecting some of the ports of the IC fabric elements to data channels of the switching system;

interconnect links connecting other ports of the IC fabric elements as links between individual IC fabric elements, the ports of the IC fabric elements that function as interconnect links between IC fabric elements being identical to the ports of the IC fabric elements that connect to data channels of the switching system; and the IC fabric elements linked in a cascade configuration with the interconnect links connecting ports of IC fabric elements, from one IC fabric element to another to form a chain of connected IC fabric elements.

5. A switching system, comprising:

first and second groups of integrated circuit (IC) switch fabric elements, each IC fabric element having a plurality of ports and switch routing circuits for selectively providing data communication between selected ports;

the first group of the IC fabric elements having I/O data paths connecting some of their ports to data channels of the switching system;

interconnect links connecting other ports of the first group of fabric elements to ports of each fabric elements of the second group fabric elements in a microstage configuration, the ports of the IC fabric elements that function as interconnect links between IC fabric elements being identical to the ports of the IC fabric elements that connect to data channels of the switching system, wherein data communication may be established between any data channel ports in two or more IC fabric elements in the first group through interconnect links with two or more IC fabric elements in the second group.

6. A switching system, comprising:

first and second groups of integrated circuit (IC) switch fabric elements, each IC fabric element having a plurality of ports and switch routing circuits for selectively providing data communication between selected ports;

the first group of the IC fabric elements having I/O data paths connecting some of their ports to data channels of the switching system;

a plurality of interconnect links connecting other ports of the IC fabric elements as links between individual fabric elements;

the first group of IC fabric elements having some ports linked in a cascade configuration with the interconnect links connecting ports of IC fabric elements, from one IC fabric element to another to form a chain of connected fabric element; and interconnect links connecting other ports of the linked chain of first group of IC fabric elements to ports of alternate ones of the IC fabric elements of the second group fabric elements in a microstage configuration, the ports of the IC fabric elements that function as interconnect links between IC fabric elements being identical to the ports of the IC fabric elements that connect to data channels of the switching system, whereby data communication may be established between any of the channels of the switching system.

7. A switching system, comprising:

a plurality of integrated circuit (IC) switch fabric elements, each IC fabric element having a plurality of ports and a switch routing circuit for each of the ports, the switch routing circuit including a steering state machine to route data from one port of the IC fabric element to one or more ports of the IC fabric element;

I/O data paths connecting some of the ports of the IC fabric elements to data channels of the switching system;

interconnect links connecting other ports of the IC fabric elements as links between individual IC fabric elements, whereby data communication may be established between any of the data channels of the switching system; and the steering state machine to route data to one or more of its ports to output data addressed to one or more data channels of the switching system.

8. A switching system according to claim 7, wherein the steering state machine for each of the ports in each of the IC fabric elements in a domain includes a domain steering table, an IC fabric element steering table, and a port steering table, and wherein the routing circuits are operative to direct data to one or more of its ports based on destination information for the data, the destination information including domain information, IC fabric element information and port information.

9. A switching system according to claim 7, wherein the steering state machine includes an alias cache for holding one or more addresses to be used by the routing circuits to direct data to one or more ports associated with the one or more addresses held in the cache.

* * * * *

UNITED STATES PATENT AND TRADEMARK OFFICE
CERTIFICATE OF CORRECTION

PATENT NO. : 6,697,359 B1
DATED : February 24, 2004
INVENTOR(S) : George

It is certified that error appears in the above-identified patent and that said Letters Patent is hereby corrected as shown below:

Column 19,
Line 19, after "connecting" delete "at least one port of".
Line 20, after "element to" delete "at least one port of".

Signed and Sealed this

Fifteenth Day of June, 2004

JON W. DUDAS
*Acting Director of the United States Patent and Trademark Office*